United States Patent [19]

Kumra et al.

[11] Patent Number: 5,633,710
[45] Date of Patent: May 27, 1997

[54] SYSTEM FOR SELF-ALIGNING VEHICLE HEADLAMPS

[75] Inventors: Mohinder Kumra, Ann Arbor; Michael F. Scherrer, Auburn Hills, both of Mich.

[73] Assignee: EGS Inc., Dearborn, Mich.

[21] Appl. No.: 539,053

[22] Filed: Oct. 4, 1995

[51] Int. Cl.⁶ .............................. G01B 11/26; B60Q 1/06
[52] U.S. Cl. .................. 356/139.08; 362/66; 315/82
[58] Field of Search .................. 356/139.06, 139.08, 356/121; 362/66, 71; 315/82, 83

[56] References Cited

U.S. PATENT DOCUMENTS

| | | | |
|---|---|---|---|
| 3,822,944 | 7/1974 | Hopkins et al. | 356/152 |
| 4,037,134 | 7/1977 | Loper | 315/78 |
| 4,533,860 | 8/1985 | Saito | 318/673 |
| 4,739,223 | 4/1988 | Baba et al. | 315/82 |
| 5,063,480 | 11/1991 | McMahan et al. | 362/61 |
| 5,107,407 | 4/1992 | Collot et al. | 362/61 |
| 5,113,330 | 5/1992 | Makita | 362/265 |
| 5,119,275 | 6/1992 | Makita | 362/61 |
| 5,140,503 | 8/1992 | Lisak | 362/61 |
| 5,151,849 | 9/1992 | Nagengast et al. | 362/61 |
| 5,193,894 | 3/1993 | Lietar et al. | 362/66 |
| 5,331,251 | 7/1994 | Marois | 315/82 |
| 5,382,877 | 1/1995 | Katsumata et al. | 315/82 |

*Primary Examiner*—Mark Hellner
*Attorney, Agent, or Firm*—Brooks & Kushman P.C.

[57] ABSTRACT

A system for self-aligning a headlamp of a vehicle, the system comprises at least one actuator which modifies an alignment of the headlamp in response to a control signal. An infrared light source is mounted to the headlamp to emit an infrared light beam toward a ground surface. An optical sensor system is oriented to sense a reflection of the infrared light beam from the ground surface. The optical sensor system has a plurality of optical sensors to sense a plurality of infrared light intensities from the reflection. A control circuit is operatively responsive to the optical sensor system to form the control signal for the at least one actuator. The control signal acts to modify the alignment of the headlamp so that the infrared light intensities satisfy at least one predetermined condition consistent with a desired alignment of the headlamp to thereby automatically align the headlamp to the desired alignment.

17 Claims, 3 Drawing Sheets

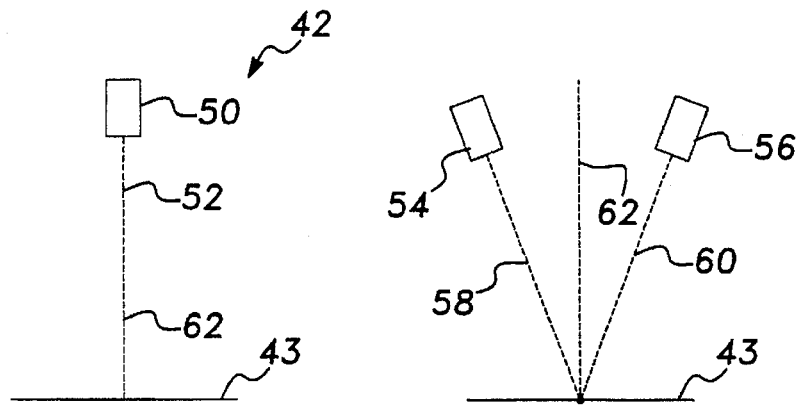
Fig-3
Fig-4
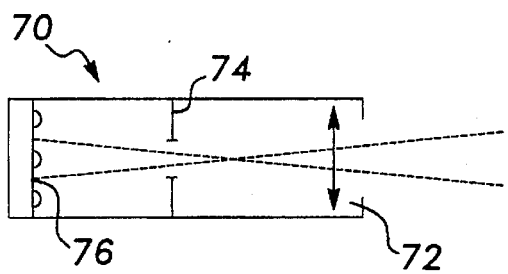
Fig-5
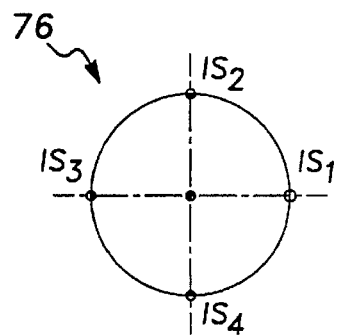
Fig-6
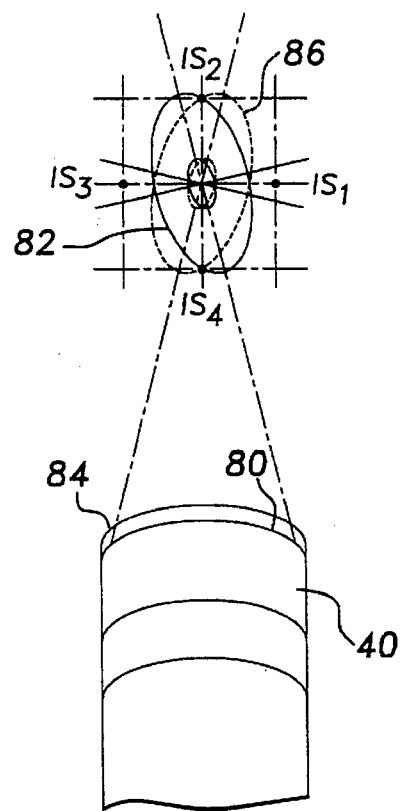
Fig-7

SYSTEM FOR SELF-ALIGNING VEHICLE HEADLAMPS

TECHNICAL FIELD

The present invention relates to methods and systems for automatically aligning headlamps or headlights of a vehicle.

BACKGROUND OF THE INVENTION

During normal road operation of a vehicle, several factors combine to cause errors in the aiming of its headlamps. If the vehicle is not equipped with an automatic self-leveling suspension, uneven loading of the vehicle causes a change of the vehicle's attitude with respect to the road, which causes a permanent error in the aim of the headlamps. The change of the road slope in front of the vehicle, which occurs when the vehicle is at the bottom or the top of a hill, for example, causes a momentary aim error of the vehicle's headlamps. Here, the aim of the headlamps is too short at the bottom of the hill, and is too far at the top of the hill. When the vehicle is driving on a bumpy road, momentary errors in the aim of the headlamps occur.

Various known approaches for automatically aligning a vehicle's headlamps are based upon a sensed attitude or loading of the vehicle at its position on a road surface. A shortcoming of these approaches is that changes in the road slope are not sensed until the vehicle is positioned on the changed-slope portion of the road. Consequently, the vehicle's headlamps are not adjusted to correct for changes in the slope of the road in front of the vehicle.

SUMMARY OF THE INVENTION

It is an object of the present invention to provide an improved self-aligning headlamp system for a vehicle.

A further object of the present invention is to provide a self-aligning headlamp system which responds to changes in the slope of a road surface before the vehicle is positioned on the changed-slope portion of the road.

Another object of the present invention is to provide a object detection system incorporated within a self-aligning headlamp system.

In carrying out the above objects, the present invention provides a system for self-aligning a headlamp of a vehicle. The system comprises at least one actuator which modifies an alignment of the headlamp in response to a control signal. An infrared light source is mounted to the headlamp to emit an infrared light beam toward a ground surface. An optical sensor system is oriented to sense a reflection of the infrared light beam from the ground surface. The optical sensor system has a plurality of optical sensors to sense a plurality of infrared light intensities from the reflection. A control circuit is operatively responsive to the optical sensor system to form the control signal for the actuator. The control signal acts to modify the alignment of the headlamp so that the infrared light intensities satisfy at least one predetermined condition consistent with a desired alignment of the headlamp to automatically move the headlamp to the desired alignment.

In one embodiment of the present invention disclosed herein, the infrared light source includes an infrared light emitting diode mounted on a surface of a reflector of the headlamp. The infrared light emitting diode emits the infrared light beam initially toward a top portion of the reflector, and the reflector redirects the infrared light beam down toward the ground surface. The infrared light source can be modulated in accordance with a vehicle-specific signature to avoid interference from an external source of infrared radiation.

The optical sensors in a preferred embodiment of the present invention include a first optical sensor, a second optical sensor, a third optical sensor, and a fourth optical sensor spaced around a fifth optical sensor. With this sensor configuration, the predetermined condition preferably includes a first condition in which the infrared light intensity sensed by the first optical sensor be substantially equal to the infrared light intensity sensed by the third optical sensor, a second condition that the infrared light intensity sensed by the second optical sensor be less than or equal to the infrared light intensity sensed by the fourth optical sensor, and a third condition that the infrared light intensity sensed by the fifth optical sensor be greater than the infrared light intensities sensed by the first optical sensor, the second optical sensor, the third optical sensor, and the fourth optical sensor.

An alternative embodiment of the present invention can further include a second infrared light source located within the vehicle, and a second actuator operatively responsive to the control circuit to modify an orientation of the optical sensor system. The control circuit commands the second actuator to rotate the optical sensor system toward the second infrared light source by a predetermined rotation. The orientation of the optical sensor system is modified so that the infrared light intensities satisfy at least one predetermined condition consistent with a desired orientation of the optical sensor system. The optical sensor system is rotated back to an operating orientation based on the predetermined rotation.

These and other features, aspects, and embodiments of the present invention will become better understood with regard to the following description, appended claims, and accompanying drawings.

BRIEF DESCRIPTION OF THE DRAWINGS

FIG. 3 illustrates a monoscopic embodiment of the optical sensor system;

FIG. 4 illustrates a stereoscopic embodiment of the optical sensor system;

FIG. 5 shows a view of an embodiment of a single optical sensor system;

FIG. 6 illustrates a configuration of optical sensors in the single optical sensor system;

FIG. 7 shows the infrared spot made by the infrared source in the headlamp;

BEST MODE(S) FOR CARRYING OUT THE INVENTION

Figure 1:
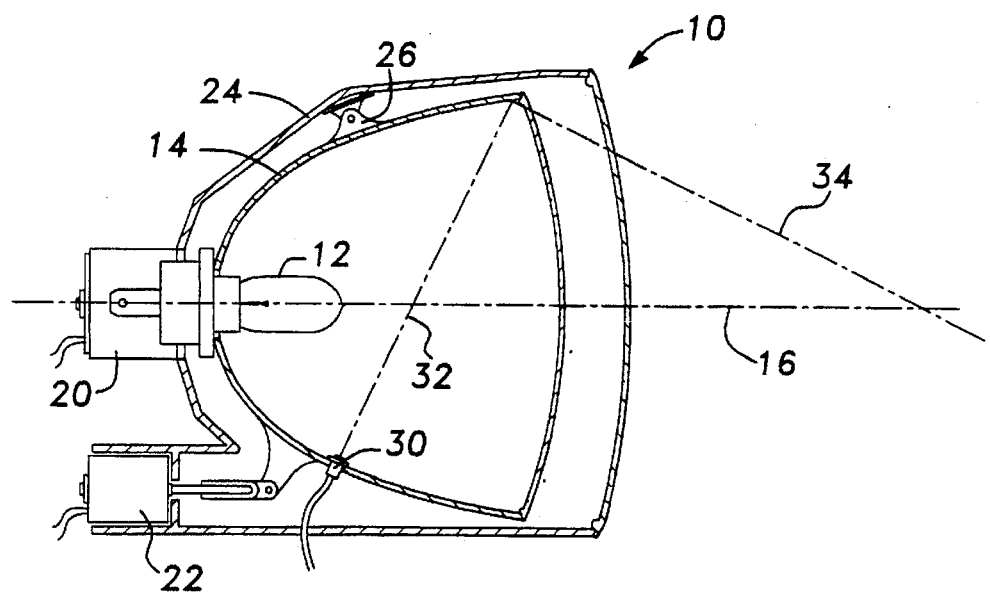
FIG. 1 shows a modified headlamp for use in embodiments of the self-aligning headlamp system.

Referring to FIG. 1, there is shown a modified headlamp 10 for use in the self-aligning headlamp system of the present invention. The modified headlamp 10 includes a lamp 12 and a reflector 14 which cooperate to direct a beam of light along a main lamp axis 16. A first control motor 20 is mechanically coupled to the lamp 12 and the reflector 14 to control the heading of the main lamp axis 16. A second control motor 22 is mechanically coupled to the lamp 12 and the reflector 14 to adjust the pitch of the main lamp axis 16. The reflector 14 is also mechanically coupled to a vehicle frame 24 by an articulator 26 having two degrees of freedom. The combination of the first control motor 20, the second control motor 22, and the articulator 26 permits the reflector 14 to rotate both in a horizontal and in a vertical plane. The maximum angular displacement for the reflector 14 can be set to a value in accordance with a specific application. The longitudinal displacement can be obtained by rotating screws (not specifically illustrated) mounted on the rotors of the first and second control motors 20 and 22. It is noted, though, that other types of actuators may be utilized to modify the alignment of the headlamp 10.

Further included in the modified headlamp 10 is an infrared light source, such as an infrared light-emitting diode (LED) 30. The infrared LED 30 is mounted on the reflector 14 to emit a narrow beam of infrared radiation along an infrared beam axis 32. The infrared beam axis 32 intersects a top portion of the reflector 14. As a result, the infrared beam is reflected by the reflector 14 to travel along a second infrared beam axis 34.

The positioning and orientation of the infrared LED 30 is chosen to project the infrared beam along the second infrared beam axis 34 toward a ground surface (such as a road). The infrared beam intersects the ground surface at a desired distance from the front of the vehicle. This distance is selected such that the infrared beams from each of two headlamps are visible from an optical sensor system (which is described hereinafter) for an angular operating range of both the vertical and the horizontal headlamp deflection.

Optionally, the infrared LED 30 can be modulated in accordance with a vehicle-specific signature to avoid interference from the self-aligning headlamp system of another vehicle, as well as other external sources of infrared light.

Figure 2:
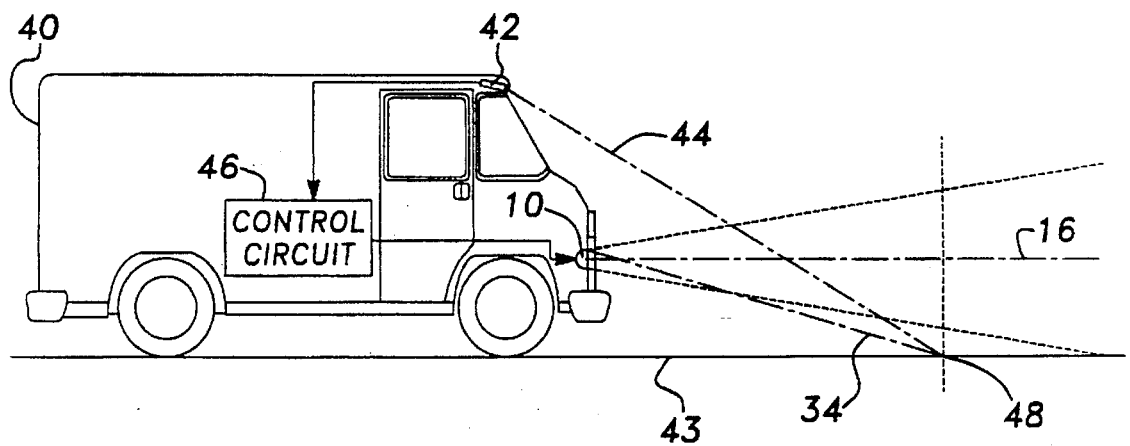
FIG. 2 shows a side view of a vehicle equipped with the modified headlamp.

Turning now to FIG. 2, there is shown a side view of a vehicle 40 which is equipped with a pair of modified headlamps as shown in FIG. 1. The modified headlamp 10 which is illustrated in FIG. 2 is shown to direct a beam of light along a main lamp axis 16 and an infrared beam along the infrared beam axis 34. The vehicle 40 is also equipped with an optical sensor system 42 comprised of one or more optical sensors. The optical sensors are oriented to sense infrared radiation which reflects from a ground surface 43 along an axis 44.

A control circuit 46 is operatively responsive to the optical sensor system 42 to form a control signal for actuating the modified headlamp 10. The control signal acts to modify the alignment of the modified headlamp 10 so that infrared intensities sensed by the optical sensor system 42 satisfy at least one predetermined condition consistent with a desired alignment of the headlamp 10. When the modified headlamp 10 is correctly aligned, the infrared beam axis 34 and the axis 44 both intersect the ground surface 43 at substantially the same point 48. The control circuit 46 can be embodied by one of the microcontrollers within the vehicle 40.

FIG. 3 illustrates a monoscopic embodiment of the optical sensor system 42. In this monoscopic embodiment, the optical sensor system 42 includes a single infrared optical sensor system 50 oriented to sense infrared radiation along an axis 52. Typically, the single infrared optical sensor system 50 is located at a central position along the width of the vehicle 40.

A stereoscopic embodiment of the optical sensor system 42 is illustrated in FIG. 4. The stereoscopic embodiment includes a first infrared optical sensor system 54 and a second infrared optical sensor system 56. Typically, the first infrared optical sensor 54 is located to one side of the vehicle 40 and the second infrared optical sensor 56 is located to the other side of the vehicle 40. The first infrared optical sensor 54 is oriented to sense infrared radiation along a first axis 58. Similarly, the second infrared optical sensor 56 is oriented to sense infrared radiation along a second axis 60. The first axis 58 and the second axis 60 intersect the ground surface 43 at substantially the same point 48.

Referring now to both FIGS. 3 and 4, the point 48 is the point at which a spot projected by the infrared LEDs of both headlamps overlap when the headlamps are perfectly aligned. The point 48 is located along an axis 62 going through the middle of the vehicle widthwise.

Attention is now directed to FIGS. 5 and 6 which provide two views of an embodiment of a single infrared optical sensor system. The optical sensor system 70 includes a lens 72 which focuses incoming infrared radiation through an iris 74. The infrared radiation which passes through the iris is directed toward a plurality of optical sensors, such as a plurality of phototransistors 76.

FIG. 6 illustrates a configuration of the phototransistors 76 which may be utilized in embodiments of the present invention. In this embodiment, the phototransistors 76 include four phototransistors $S_1$, $S_2$, $S_3$ and $S_4$ equally spaced around a circle having a phototransistor $S_0$ at its center. When the headlamp is properly adjusted, the intensity of the infrared signal received from the headlamp is such that the following conditions are satisfied: (i) the infrared intensity perceived by the phototransistor $S_1$ is substantially equal to the intensity perceived by the phototransistor $S_3$; (ii) the infrared intensity perceived by phototransistor $S_2$ is less than or equal to the intensity perceived by the phototransistor $S_4$; (ii) the infrared intensity perceived by phototransistor $S_0$ is greater than the intensity perceived by the phototransistor $S_1$; and (iv) the infrared intensity perceived by the phototransistor $S_0$ is greater than the intensity perceived by the phototransistor $S_2$. Alternative embodiments are not limited to these conditions, and may utilize any predetermined condition consistent with a desired alignment of the headlamp to automatically align the headlamp to the desired alignment.

For the following discussion, it is assumed that an infrared sensor system is located on the median axis of the vehicle on the front windshield. Further, the following discussion is based upon an embodiment of the present invention wherein only the pitch of the headlamp is corrected, and the adjustment of the heading (i.e., the angle in the horizontal plane) of the headlamp is disabled.

The infrared spot made by the infrared LEDs in the headlamps is pictured in FIG. 7. The infrared emission can be viewed as a cone with a circular base. This cone intercepts the plane of the ground surface at an angle so as to create an elliptic infrared spot thereon. When the headlamps are properly lined up and the vehicle's attitude is ideal, the infrared LED in the right headlamp 80 produces an ellipse 82, while the infrared LED in the left headlamp 84 produces an ellipse 86. The points $IS_0$, $IS_1$, $IS_2$, $IS_3$, and $IS_4$ are the images of the infrared photodetectors $S_0$, $S_1$, $S_2$, $IS_3$, and $S_4$ in the plane of the ground surface.

Figure 8:
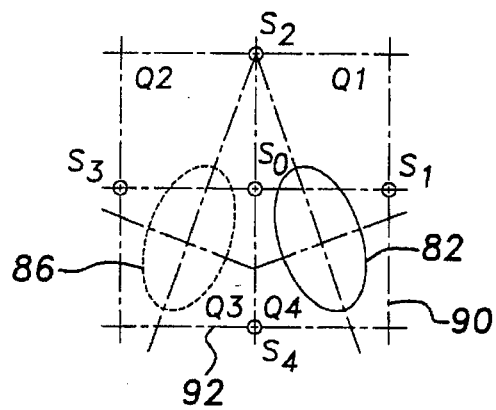
FIG. 8 illustrates the location of the infrared ellipses if the aim of the headlamps is too short.

FIG. 8 illustrates the location of the ellipses if the aim of the headlamps is too short. If the aim is short, the infrared spot caused by the right infrared beam moves to the fourth quadrant 90 of the infrared sensor system, while the infrared spot caused by the left infrared beam moves to the third quadrant 92. More specifically, the center of the ellipse 82 shifts into the fourth quadrant 90, and the center of the ellipse 86 shifts into the third quadrant 92.

Consequently for the left headlamp, the infrared intensity perceived by the phototransistor $S_3$ is greater than the intensity perceived by the phototransistor $S_1$, and the infrared intensity perceived by the phototransistor $S_4$ is greater than the intensity perceived by the phototransistor $S_2$. For the right headlamp, the infrared intensity perceived by the phototransistor $S_3$ is less than the intensity perceived by the phototransistor $S_1$, and the infrared intensity perceived by the phototransistor $S_4$ is less than the intensity perceived by the phototransistor $S_2$. Further, the infrared intensity perceived by the phototransistor $S_3$ using the left headlamp's infrared transmitter is approximately equal to the intensity perceived by the phototransistor $S_1$ using the infrared transmitter in the right headlamp. The infrared intensity perceived by the phototransistor $S_1$ using the infrared transmitter in the left headlamp is approximately equal to the intensity perceived by the phototransistor $S_3$ made using the infrared transmitter in the right headlamp. Also, the infrared intensity perceived by the phototransistor $S_4$ is approximately the same for both the infrared transmitter from the left headlamp and the infrared transmitter from the right headlamp.

Figure 9:
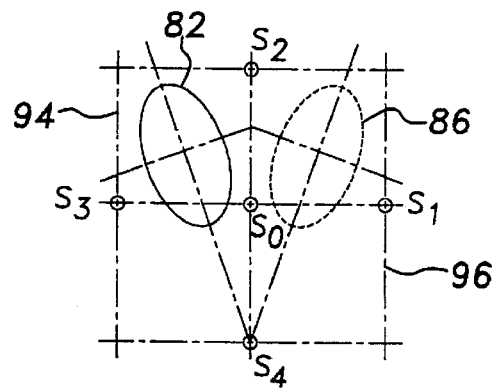
FIG. 9 illustrates the location of the infrared ellipses if the aim of the headlamps is too long.

FIG. 9 illustrates the shifting of the two ellipses 82 and 86 when the aim of the headlamps is too long. The center of the ellipse 82 shifts into the second quadrant 94, while the center of the ellipse 86 shifts into the first quadrant 96 of the detector. Consequently, the infrared intensity perceived by $S_3$ is less than the intensity perceived by $S_1$, and the infrared intensity perceived by $S_4$ is less than the intensity perceived by $S_2$. For the right headlamp, the infrared intensity perceived by $S_3$ is greater than the intensity perceived by $S_1$, and the infrared intensity perceived by $S_4$ is greater than the intensity perceived by $S_2$. Further, the infrared intensity perceived by $S_3$ for the left headlamp is approximately equal to the intensity perceived by $S_1$ for the right headlamp. The infrared intensity perceived by $S_1$ for the left headlamp is approximately equal to the intensity perceived by $S_3$ for the right headlamp. Also, the infrared intensity perceived by $S_2$ for the left headlamp is approximately equal to the intensity perceived by $S_2$ for the right headlamp.

The above set of relations are utilized by the control circuit to correct errors in the pitch of the headlamp with respect to the road. As a result, an ideal illumination of the road is maintained in the presence of any factor causing the vertical aim angle to be incorrect.

Angular errors in both the vertical and the horizontal planes may be present after a headlamp or a bulb replacement or after a collision, for example. Embodiments of the present invention can be utilized to make an adjustment so as to correct for the angular errors. During such an adjustment, it is preferred that the vehicle has its normal, unloaded attitude, and the vehicle is located on a substantially flat surface from beneath the car to some distance (such as 25 feet) in front of the car.

Figure 10:
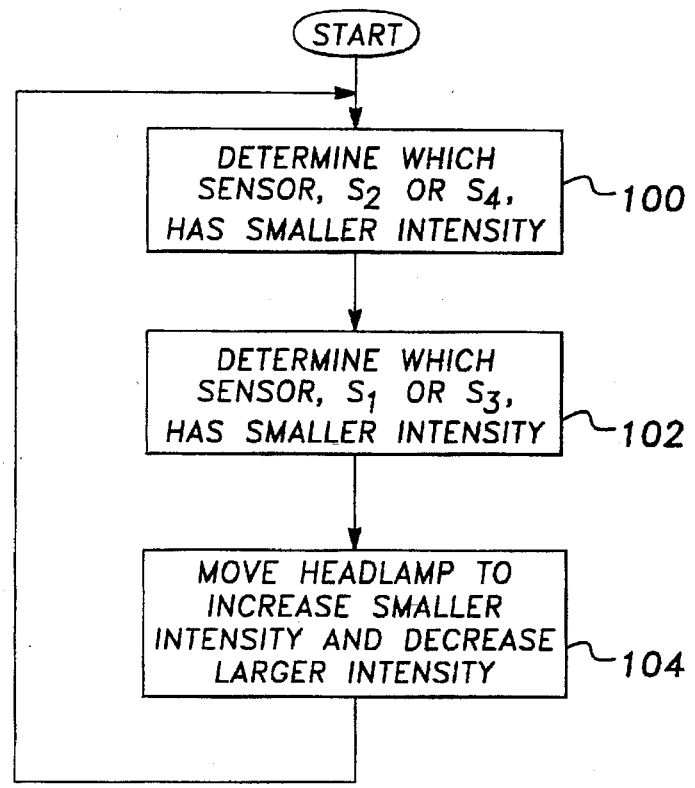
FIG. 10 is a flow chart of a method for aligning the headlamps for use in embodiments of the present invention.

If the above conditions are met, embodiments of the present invention will automatically align the headlamps to an ideal setup. Each headlamp perceives separately, without regard to the other lamp's position. A flow chart of a method for aligning the headlamps is illustrated in FIG. 10. This method is performed using the control circuit illustrated in FIG. 2.

As illustrated by block 100, a step of determining which sensor, $S_2$ or $S_4$, has the smallest intensity. The method proceeds by performing a step of determining which sensor, $S_1$ or $S_3$, has the smallest perceived intensity, as indicated by block 102.

As indicated by block 104, a step of moving the headlamp so as to increase the intensity detected by the sensor with the smaller intensity and decrease the intensity detected by the sensor with the larger intensity is performed. The steps indicated by blocks 100, 102, and 104 are repeated until the intensity of $S_1$ is substantially equal to the intensity of $S_3$, the intensity of $S_2$ is less than or equal to the intensity of $S_4$, and the intensity of $S_0$ is greater than the intensity of the other four sensors. It is noted that the intensity of $S_1$ is deemed to be approximately equal to the intensity of $S_3$ when the difference in the intensities is less than a predetermined threshold.

Under the above-described conditions of unloaded attitude and a flat ground surface, a single monoscopic sensor is sufficient to provide a complete feedback system for self-aligning the headlamps. To accommodate the more general situation where no preliminary assumptions are made regarding the setup, a stereoscopic embodiment of the present invention is utilized. In the stereoscopic embodiment, the left and the right infrared sensors have an image that coincide only in the plane corresponding to the ideal horizontal plane for an ideal vehicle attitude toward the point 48 as depicted in FIGS. 2–4. Assuming a continuous ground surface (i.e. no grid, manholes or other similar objects within 25 feet of the front of the car), the differences between the ideal and the actual spot locations (left ellipse 86 and right ellipse 82) are perceived by the two optical sensor systems 54 and 56. The control circuit 46 receives four distinct parameters and uses them to compute three equations of three variables in cylindrical coordinates. These equations have a unique solution which is then used to adjust the headlamps to their ideal position in a set-up mode.

If an object in close proximity to the vehicle intercepts the infrared beam of any lamp, the image of the beam perceived by the infrared sensor differs substantially from preceding images and from images collected from the other beam. This causes a sudden discontinuity that can be detected and reported. In cases of dense fog where the system cannot maintain a clear picture of the road, the system can disable itself, and set itself to an appropriate default attitude.

The accuracy of the self-aligning headlamp system is dependent upon the proper positioning and orientation of the optical sensor system. In order to correct for errors in the positioning and orientation of the optical sensor system, two linear actuators are utilized to properly align the sensor. The two actuators allow the sensor to span a pre-defined angular range both vertically and horizontally with respect to its base.

An optical sensor equipped with at least one actuator can be aligned utilizing an infrared transmitting LED located in the cabin of the vehicle. The location of the LED is such that for a predetermined rotation of the sensor (say, 180 degrees), the image of the LED therein is exactly on the sensor $S_0$ for a perfectly aligned system. If the sensor is not perfectly aligned, the method of FIG. 10 can be applied to the optical sensor itself to provide alignment thereof. Once the alignment is made to the sensor, the sensor is rotated back to its normal operating position. A locking mechanism can be utilized to lock the sensors in this operating position for normal car usage. Typically, the above procedure is performed at the factory or at a time after an accident which causes the sensors to be either damaged or misaligned. For a stereoscopic embodiment of the present invention, two infrared transmitting LEDs are located in the cabin of the vehicle. Each of the two optical sensors are aligned using the above-described method.

The above-described embodiments of the present invention have many advantages. The self-aligning system automatically aligns the headlamps to compensate for changes in attitude of the vehicle with respect to the road. Further, embodiments of the present invention can detect the presence of potentially unseen objects in close proximity to the front of the vehicle, and can provide a warning thereof to the driver.

Embodiments of the present invention are also advantageous in eliminating a need for a time-consuming headlamp alignment at the factory or later during a service. This results from a set-up mode wherein a self-calibration of the system is performed to automatically align the headlamps. For the monoscopic embodiment, the set-up mode is performed with the vehicle unloaded and located on a surface which is flat for 25 feet in front of the vehicle. For the stereoscopic embodiment, no special set-up requirements need be performed.

Embodiments of the present invention are also advantageous in providing two operative modes: (i) a set-up mode for initial alignment at the factory and later during vehicle servicing, and (ii) a "road" mode where road-tracking level adjustments are made.

Although the best mode for carrying out the invention has been described in detail, those familiar with the art to which this invention relates will recognize various alternative designs and embodiments for practicing the invention as defined by the following claims.

What is claimed is:

1. A system for self-aligning a headlamp of a vehicle, the system comprising:

at least one actuator which modifies an alignment of the headlamp in response to a control signal;

an infrared light source mounted to the headlamp to emit an infrared light beam toward a ground surface;

an optical sensor system oriented to sense a reflection of the infrared light beam from the ground surface, the optical sensor system having a plurality of optical sensors to sense a plurality of infrared light intensities from the reflection; and a control circuit operatively responsive to the optical sensor system to form the control signal for the at least one actuator, wherein the control signal acts to modify the alignment of the headlamp so that the infrared light intensities satisfy at least one predetermined condition consistent with a desired alignment of the headlamp to thereby automatically align the headlamp to the desired alignment.

2. The system of claim 1 wherein the infrared light source includes an infrared light emitting diode mounted on a surface of a reflector of the headlamp, the infrared light emitting diode emitting the infrared light beam initially toward a top portion of the reflector, wherein the reflector redirects the infrared light beam down toward the ground surface.

3. The system of claim 1 wherein the infrared light source is modulated in accordance with a vehicle-specific signature to avoid interference from an external source of infrared radiation.

4. The system of claim 1 wherein the at least one predetermined condition includes a first condition based upon a comparison of infrared light intensities sensed by two of the plurality of optical sensors.

5. The system of claim 1 wherein the optical sensors includes a first optical sensor, a second optical sensor, a third optical sensor, and a fourth optical sensor spaced around a fifth optical sensor.

6. The system of claim 5 wherein the at least one predetermined condition includes a condition that the infrared light intensity sensed by the first optical sensor be substantially equal to the infrared light intensity sensed by the third optical sensor.

7. The system of claim 5 wherein the at least one predetermined condition includes a condition that the infrared light intensity sensed by the second optical sensor be less than or equal to the infrared light intensity sensed by the fourth optical sensor.

8. The system of claim 5 wherein the at least one predetermined condition includes a condition that the infrared light intensity sensed by the fifth optical sensor be greater than the infrared light intensities sensed by the first optical sensor, the second optical sensor, the third optical sensor, and the fourth optical sensor.

9. The system of claim 5 wherein the at least one predetermined condition includes a first condition that the infrared light intensity sensed by the first optical sensor be substantially equal to the infrared light intensity sensed by the third optical sensor, a second condition that the infrared light intensity sensed by the second optical sensor be less than or equal to the infrared light intensity sensed by the fourth optical sensor, and a third condition that the infrared light intensity sensed by the fifth optical sensor be greater than the infrared light intensities sensed by the first optical sensor, the second optical sensor, the third optical sensor, and the fourth optical sensor.

10. The system of claim 1 wherein the at least one actuator includes a first control motor which modifies a pitch of the headlamp and a second control motor which modifies a heading of the headlamp.

11. The system of claim 1 further comprising:

a second infrared light source located within the vehicle; and a second actuator operatively responsive to the control circuit to modify an orientation of the optical sensor system;

wherein the control circuit commands the second actuator to perform the steps of rotating the optical sensor system toward the second infrared light source by a predetermined rotation, modifying the orientation of the optical sensor system so that the infrared light intensities satisfy at least one predetermined condition consistent with a desired orientation of the optical sensor system, and rotating the optical sensor system back to an operating orientation based on the predetermined rotation.

12. The system of claim 11 wherein the optical sensors includes a first optical sensor, a second optical sensor, a third optical sensor, and a fourth optical sensor spaced around a fifth optical sensor, and wherein the at least one predetermined condition consistent with the desired orientation includes a condition that the infrared light intensity sensed by the fifth optical sensor be greater than the infrared light intensities sensed by the first optical sensor, the second optical sensor, the third optical sensor, and the fourth optical sensor.

13. A system for self-aligning a headlamp of a vehicle, the system comprising:

at least one control motor which modifies an alignment of the headlamp in response to a control signal;

an infrared light emitting diode mounted on a surface of a reflector of the headlamp, the infrared light emitting diode emitting an infrared light beam toward a top portion of the reflector for redirection down toward a ground surface, the infrared light beam being modulated in accordance with a vehicle-specific signature;

an optical sensor system having a plurality of optical sensors oriented to sense a plurality of infrared light intensities from a reflection of the infrared light beam from the ground surface, the plurality of optical sensors including a first optical sensor, a second optical sensor, a third optical sensor, and a fourth optical sensor equally spaced around a fifth optical sensor; and a control circuit operatively responsive to the optical sensor system to form the control signal for the at least one control motor, wherein the control signal acts to modify the alignment of the headlamp so that the infrared light intensities satisfy a plurality of predetermined conditions consistent with a desired alignment of the headlamp, the plurality of predetermined conditions including a first condition that the light intensity sensed by the first optical sensor be substantially equal to the light intensity sensed by the third optical sensor, a second condition that the light intensity sensed by the second optical sensor be less than or equal to the light intensity sensed by the fourth optical sensor, and a third condition that the light intensity sensed by the fifth optical sensor be greater than the light intensities sensed by the first optical sensor, the second optical sensor, the third optical sensor, and the fourth optical sensor.

14. A system for self-aligning a right headlamp and a left headlamp of a vehicle, the system comprising:

a first control motor which modifies a pitch of the right headlamp in response to a first control signal;

a second control motor which modifies a heading of the right headlamp in response to a second control signal;

a third control motor which modifies a pitch of the left headlamp in response to a third control signal;

a fourth control motor which modifies a heading of the left headlamp in response to a fourth control signal;

a first infrared light source mounted to the right headlamp to emit a first infrared light beam toward a ground surface;

a second infrared light source mounted to the left headlamp to emit a second infrared light beam toward the ground surface, wherein the first infrared light beam and the second infrared light beam intersect the ground surface at substantially the same location for a desired alignment of the right headlamp and the left headlamp;

a first optical sensor system oriented to sense a reflection of the first infrared light beam from the ground surface, the optical sensor system having a first plurality of optical sensors to sense a first plurality of infrared light intensities from the reflection;

a second optical sensor system oriented to sense a reflection of the first infrared light beam from the ground surface, the optical sensor system having a second plurality of optical sensors to sense a second plurality of infrared light intensities from the reflection; and a control circuit operatively responsive to the first and second optical sensor systems to form the first, second, third, and fourth control signals for the first, second, third, and fourth control motors, wherein the control signals acts to modify the alignment of the headlamps so that the infrared light intensities satisfy at least one predetermined condition consistent with the desired alignment of the headlamp to thereby automatically align the headlamps to the desired alignment.

15. The system of claim 14 wherein the first plurality and the second plurality of optical sensors each includes a first optical sensor, a second optical sensor, a third optical sensor, and a fourth optical sensor spaced around a fifth optical sensor.

16. The system of claim 14 wherein the first optical sensor system is mounted to one side of the vehicle, and the second optical sensor system is mounted to another side of the vehicle.

17. The system of claim 14 wherein at least one of the first, second, third, and fourth control signals is dependent upon a difference in infrared light intensity between one of the first plurality of optical sensors and one of the second plurality of optical sensors.

* * * * *